United States Patent
Shulgin

(10) Patent No.: US 10,981,841 B1
(45) Date of Patent: Apr. 20, 2021

(54) STABILIZED AMMONIUM HUMATE COATING FOR FERTILIZER GRANULES

(71) Applicant: Organocat, LLC, Louisville, KY (US)

(72) Inventor: Alexander I. Shulgin, Louisville, KY (US)

(73) Assignee: OrganoCat, LLC, Louisville, KY (US)

( * ) Notice: Subject to any disclaimer, the term of this patent is extended or adjusted under 35 U.S.C. 154(b) by 0 days.

(21) Appl. No.: 16/712,447

(22) Filed: Dec. 12, 2019

(51) Int. Cl.
  *C05G 5/30* (2020.01)
  *C05F 11/02* (2006.01)
  *C05C 9/00* (2006.01)
  *C05C 3/00* (2006.01)
  *C05G 5/23* (2020.01)
  *C05B 7/00* (2006.01)
  *C05D 1/00* (2006.01)

(52) U.S. Cl.
  CPC ............ *C05G 5/30* (2020.02); *C05B 7/00* (2013.01); *C05C 3/005* (2013.01); *C05C 9/005* (2013.01); *C05D 1/005* (2013.01); *C05F 11/02* (2013.01); *C05G 5/23* (2020.02)

(58) Field of Classification Search
  None
  See application file for complete search history.

(56) References Cited

U.S. PATENT DOCUMENTS

| | | | |
|---|---|---|---|
| 1,606,015 A * | 11/1926 | Blackwell | C05B 17/00 71/6 |
| 3,111,404 A * | 11/1963 | Karcher | C05F 11/02 71/24 |
| 3,264,084 A * | 8/1966 | Karcher | C05G 1/00 71/24 |
| 5,026,416 A * | 6/1991 | Alexander | C05F 11/02 71/24 |
| 5,749,934 A * | 5/1998 | Parent | C05F 11/02 71/24 |
| 6,056,801 A * | 5/2000 | Parent | C05B 7/00 71/24 |
| 8,580,979 B1 * | 11/2013 | Shulgin | C05F 11/02 549/359 |
| 10,259,754 B2 * | 4/2019 | Merritt | C05G 5/10 |
| 2006/0058566 A1 * | 3/2006 | Shulgin | C02F 1/54 588/316 |
| 2018/0290941 A1 * | 10/2018 | Yang | C05F 11/02 |

OTHER PUBLICATIONS

Schwab,G.J; Murdok,L.W. Nitrogen Transformation Inhibitors and Controlled Release Urea. University of Kentucky—College of Agriculture. Cooperative extension service. p. 5, Apr. 2010.
Krogmeier, M.G.; McCarty, G.W.; , Bremner, J.M. Potential phytotoxicity associated with the use of soil's urease inhibitor 1989, http://www.pnas.org/content/86/4/1110.full.pdf.
P. A. Ludden, D. L. Harmon, G. B. Huntington, B. T. Larson and D. E. Axe. Influence of the novel urease inhibitor N-(n-butyl) thiophosphoric triamide on ruminant nitrogen metabolism. 2000.
MSDS. N-SERV24 Nitrogen Stabilizer. Oct. 28, 2013.
Rosliza S., Ahmed O.H. and Majid N.M. Controlling Ammonia Volatilization by Mixing Urea with Humic Acids, Fulvic Acids, Triple Superphosphate and Muriate of Potash. American Journal of Environmental Science 5 (5): p. 605-609, 2009.
Reeza A.A., Ahmed O.H., Majid N.M., Jallon M.B. Reducing Ammonia Loss from Urea by Mixing with Humic and Fulvic Acids Isolated from Coal. American Journal of Environmental Science 5 (3): p. 420-426, 2009.
Devevre; O.C.; Horwath; W.R. Stabilization of Fertilizer Nitrogen-15 into Humic Substances in Aerobic vs. Waterlogged Soil Following Straw Incorporation. Soil Sci. Soc. Am. J. 65:499-510. 2001. p. 499-510.

* cited by examiner

Primary Examiner — Wayne A Langel
(74) Attorney, Agent, or Firm — Middleton Reutlinger

(57) ABSTRACT

A stabilized ammonium humate mixture including an amount of humic acid between about 7.0% to about 10% of the mixture and an amount of ammonia between about 1.0% to about 14% of the mixture, where the remainder of the mixture is water. The stabilized ammonium humate mixture has a pH between about 9 to about 11.

16 Claims, No Drawings

STABILIZED AMMONIUM HUMATE COATING FOR FERTILIZER GRANULES

BACKGROUND

Modern agriculture has seen an increase in the use of various granular chemical fertilizers, such as urea, ammonium sulfate, mono-diammonium phosphate, potassium nitrate, and so on. These may be applied to the soil at a rate of tens of pounds per acre up to hundreds of pounds per acre, and these granular fertilizers may also be the main source of nutrients for plants. It is known that use of mineral fertilizers and other chemicals may have resulted in the loss of soil organic and mineral matter, the suppression of native microbial populations, the disturbance of natural pH levels, the reduction of soil absorbing capacity, and generally result in soil degradation. This also negatively impacts soil fertility. Furthermore, plants only typically consume about one-half of the fertilizer applied to agricultural fields.

The remainder of the fertilizer applied to agricultural fields may seep into the ground water or run-off, and may be a primary contributor to water pollution, called eutrophication. Generally, the more degraded soil is, the more extensive the problem. Nitrogen fertilizer, and especially urea, may be the most destructive for native soil composition, properties, and functions. Nitrogen loss may be between 25% to 75% as a result of ammonia volatilization, nitrification, and denitrification, which is why nitrogen management in soil, including its stabilization and buffering is important.

One traditional method for reducing the loss of nitrogen, phosphorus, and potassium is coating a mineral fertilizer with a polymer, fat, grease, or sulfur. These form what are referred to as "slow release" or "control release" fertilizers, as coating with natural and chemical/synthetic agents slow down the fertilizers solubilization, ammonia volatilization, nitrification, and/or denitrification, as well as the reduction in phosphate immobilization by soil ions thus keeping the nutrients available longer for plants.

Another conventional method for dealing with the above-mentioned problems is a urease inhibitor, which may slow ammonia volatilization. However, urease inhibitors may also have a negative impact on the plant and cause necrosis due to urea accumulation in plant tissue. Furthermore, urease inhibition may also result in the suppression of a wide group of soil bacteria that use urease as a tool for nitrogen uptake, which may lead to an imbalance of native soil microbial populations and could even potentially result in an influx of pathogenic microbial species. There are also nitrification inhibitors (e.g. N-SERV 24 Nitrogen Stabilizer™), which may depending on soil conditions, slow the nitrification process. While such products may inhibit nitrifying bacteria (i.e. a group of bacteria which convert ammonium into nitrites/nitrates), they may also be hazardous for humans and toxic for the environment.

The above referenced methods for reducing nitrogen loss may be viscous liquids and once applied to a fertilizer granule results in a sticky surface making the granules prone to build up and granule agglomeration into large chunks/lumps. This agglomeration may clog transporters, hoppers, spreading system, etc. Viscosity may be temperature dependent; for example, at lower temperature the viscosity may increase resulting in increased stickiness and agglomeration. Furthermore, the freezing temperatures of these conventional methods of reducing nitrogen loss are relatively high (e.g. slightly below or close to 32 F), which makes their application problematic in late fall or early spring.

Other methods of addressing the issue of nitrogen loss include mixing urea with acidic materials alone or also with humic and fulvic acids. The acidic material binds ammonia into ammonium salts, thus reducing ammonia volatilization; however, this method does result in mobile ammonium salts as well as nitrite/nitrate salts that may be leached. In some instances, mixing urea with acidic materials and humic/fulvic acids may reduce ammonia loss as compared to urea alone and increased ammonium and nitrate content in soil as compared to urea alone. However, this such mixing adds extra cost to urea nitrogen fertilizer, and furthermore, adding humic/fulvic acids to the mixture may result in granules agglomeration to large chunks/lumps that may clog transporters, spreading systems, etc.

SUMMARY

The present invention relates to primal plant's nutritional nitrogen, as well as phosphorus and potassium management by their stabilization and buffering in soil by coating N—P—K fertilizer granules with liquid stabilized ammonium humate ("SAH") that is extracted from brown coal (lignite, leonardite) with application of diluted aqueous ammonia.

In an aspect, a stabilized ammonium humate mixture includes: an amount of humic acid ranging between about 8.0% to about 10% of the mixture; and an amount of ammonia ranging between about 1% to about 14% of the mixture, and where the remainder of the mixture is water; and where the stabilized ammonium humate mixture has a pH between about 9.5 to about 11.

In some embodiments, the amount of ammonia ranges between about 7% and about 9.5%. In other embodiments, the amount of ammonia ranges between about 9% and about 10%. In other embodiments, the amount of humic acid ranges between about 8.5% and about 9.5%. In some embodiments, the pH is about 11.

In some embodiments, the mixture is configured to coat a mineral fertilizer granule. In some such embodiments, the mineral fertilizer granule is a urea granule.

In another aspect, a method of manufacturing stabilized ammonium humate, includes: obtaining a humic acid containing material with a particle size of about 3 millimeters or less; heating water to about 50° C. to about 55° C.; mixing the heated water with an about 25% to about 30% aqueous ammonia solution at a ratio ranging between about 2:1 to about 1:1 to form a diluted aqueous ammonia; adding the humic acid containing material to the diluted aqueous ammonia at a ratio of 1:5; mixing the humic acid containing material and the diluted aqueous ammonia forming a slurry; separating the slurry into a supernatant and a precipitate, where the supernatant is the stabilized ammonium humate and sediment.

In some embodiments, the particle size is about 1 millimeter to about 3 millimeters. In some embodiments, the ratio of heated water to the about 25% to about 30% aqueous ammonia is 2:1. In other embodiments, the mixing of the humic acid containing material and the diluted aqueous ammonia is for about 20 minutes.

In some embodiments, the ratio of heated water to the about 25% to 30% aqueous ammonia is about 28:1.

In some embodiments, the supernatant has a yield of about 76% to about 80%. In some embodiments, the supernatant has a dissolved solid content of about 11.0% to about 12.5%. In some embodiments, the supernatant includes about 9.0% to about 11.5% humic acid.

In some embodiments, separating the slurry into the supernatant and the precipitate is by gravity.

In still yet another aspect, a method of nutrient management of soil includes: obtaining stabilized ammonium humate mixture/solution, where the mixture/solution includes: humic acid ranging between about 8.0% to about 10% of the mixture and an amount of ammonia ranging between about 1% to about 14% of the mixture, where a remainder of the mixture is water, and where the stabilized ammonium humate mixture has a pH between about 9.5 to about 11; mixing the stabilized ammonium humate with a fertilizer granule at a dosage of about 0.5 to about 1.0 gallons of the stabilized ammonium humate per ton of fertilizer.

In some embodiments, the fertilizer is a urea granule.

As used herein the term "nitrogen stabilization" means the prolonged existence of nitrogen in soil in forms that are available for plants and soil microorganisms without, or in reduced rate, of nitrogen loss due to leaching, volatilization, nitrification, and/or denitrification.

As used herein the term "buffering" means the prolonged existence of ammoniacal and/or nitrate nitrogen in soil due to the ability of the soil to keep these substances without rapid conversion into other nitrogen forms that are not available to plants, for example gaseous ammonia, gaseous nitrous oxides, and gaseous molecular nitrogen.

When used herein, in both the specification and claims, the term "about" used an adverb rather than as a preposition means "approximately" and comprises the stated value and every value within 10% of that value; in other words, "about 100%" includes 90% and 110% and every value in between.

DETAILED DESCRIPTION

As described in detail herein, stabilized ammonium humate may be used as mineral fertilizer coating. Stabilized ammonium humate treated fertilizer granules may dry rapidly, which minimizes the agglomeration of the granules. Furthermore, the stabilized ammonium humate coating may reduce nitrogen loss, facilitate storage of phosphate and potassium in forms available for plant use, support native soil microorganisms, and stimulate seed germination, plant growth, and development.

Conventional methods of manufacturing ammonium humate have a number of limitations. For example, the slurry formed of brown coal and aqueous ammonia may contain excess amounts of dissolved ammonia, hydrated and hydrolyzed coal particles (in which there is some bitumen, mineral carbon, aluminum, iron, manganese, etc. oxides/hydroxides, silicates, etc.), and water. The separation of the particulate matter and liquid solution is both time and labor intensive because the brown coal particles in the slurry may swell resulting in sticky/tacky sediment. As another example, the resulting solution has a low percentage of ammonium humate (ammonium salt of humic acid) and a high pH (approximately 12), which may result in the product being classified as "highly corrosive" along with the corresponding restrictions on manufacture, storage, transportation, and handling. The strong ammonium smell may be an additional limiting factor, as it may cause a reaction among workers and/or create an unpleasant working environment. Additionally, the slurry or separated liquid particulate matter from these methods may not be used as a coating for a fertilizer granule, because it is likely to clogs pipes, spraying heads, etc. Another limiting factor may be the freezing temperature of liquid ammonium humate, which may make the ammonium humate thick, icy, difficult to pump, or even frozen at low ambient temperatures. For example, in the northern United States (and other countries) coating of granular fertilizers and application of the same to soil may begin in late winter to early spring when temperature may be below 32° F. (0° C.). Low temperatures in these regions may be as low as minus 12° F. (−24° C.) when some farmers begin "early spring" fertilizer addition to soil. In most instances, the ambient temperatures in these regions may be around 26° F. (−3° C.) during the fertilizer preparation and application to soil. Furthermore, the transportation of ammonium humate during colder seasons, along with its storage in non-conditioned warehouses, may result in freezing into a thick and icy material that makes application as liquid additive/coating to fertilizers difficult. Heating of the frozen material allows it to return to its original state (liquid, easy flowing, pumpable material), but requires time, labor, and energy thus making the material more expensive and inconvenient to use.

An improved method of manufacturing a stabilized ammonium humate liquid with higher humic acid content, higher supernatant yield (i.e. less sediment), improved fluidity, lower pH, lower freezing temperature, and reduced corrosiveness and ammonia smell is desired.

Analyses were conducted in order to evaluate the effect of various parameters and conditions. In a first example, commercial aqueous ammonia with a 28% wt. concentration may be blended with lignite at a ratio ranging from 1:20 to 1:5 lignite to aqueous ammonia by mass until a stable slurry is formed in order to extract humic acid. In some instances, a ratio below 1:5, for example 1:4, 1:3, etc. may make the slurry too heavy and concentrated for mechanical treatment (e.g. mixing, pumping, etc.). In some instances, a ratio above 1:20, for example 1:22, etc. may make the slurry too diluted for humic acid extraction. This process may be carried out at ambient temperature. After sediment precipitation and supernatant removal, the supernatant/solution was analyzed on dissolved solids content (primarily humic and fulvic acids). The humic acid content ("California Method"), pH, and percent yield of the solution were determined. The results are presented in Table 1 below.

TABLE 1

| Lignite:Aqueous Ammonia Ratio | Dissolved Solids Content | Humic Acid Content | Solution Yield | pH |
|---|---|---|---|---|
| 1:20 | 2.52% | 1.74% | 96.1% | 12.06 |
| 1:10 | 4.6% | 3.61% | 79.2% | 11.8 |
| 1:6.5 | 6.92% | 5.08% | 67.5% | 11.7 |
| 1:5 | 8.66% | 6.7% | 59% | 11.6 |

As illustrated by the results of Table 1, the higher the lignite content the greater the dissolved solids (and humic acid) content in the supernatant and the less supernatant yield. The maximum dissolved solids (and humic acid) content was achieved with a lignite to aqueous ammonia ratio of 1:5 but was also the lowest solution yield (59%); therefore, roughly 41% of the slurry swelled, generating a sticky, adhesive sediment that is waste product. The lowest lignite to aqueous ammonia ratio, 1:20, resulted in the lowest dissolved solids (and humic acid) content. The freezing temperature of these products may be below −20° F. (−28° C.). Each of the presented in Table 1 have a strong ammonia smell.

The efficacy of the process may not be able to be improved by increasing the temperature of original/commercial aqueous ammonia, because intensive ammonia release and water evaporation may result. Furthermore, an increase in the mixing time may result in an increase in sediment swelling, higher volume of sediment or a lower supernatant yield.

The dominating functional groups in humic acid are carboxylic (—COOH) and phenolic (>OH) groups, and most of the properties and functions of humic acid are a result of activity of these functional groups. The schematic formula for humic acid (and fluvic acid) is presented as following:

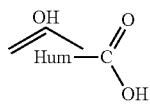

Where "Hum" is the volumetric part of humic acid molecules with phenolic hydroxide (OH) functional group in them and "COOH" is a carboxylic functional group.

Ammoniacal nitrogen (ammonium cation) has a high affinity for phenolic hydroxide, which may result in the replacement of protons (hydrogen cations) with ammonium cations. Where the ammonium concentration is low, all of the ammonium may be bonded by phenolic groups according to the described ion exchange mechanism. Where the ammonium concentration is higher and all phenolic groups are already saturated (e.g. bonded) with ammonium, then ammonium may also replace the hydrogen cation in the carboxylic groups, resulting in a molecule "saturated" with ammonium, or a ammonium saturated molecules of humic acid. The schematic formula for such a molecule is presented below:

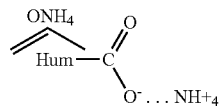

Generally, ammonium saturated humic acid may be the result of the extraction of humic acid with original/commercial aqueous ammonia containing an ammonia content ranging from about 25% to about 30% (commercially available reagents with maximum ammonia content).

Original/commercial aqueous ammonia that is diluted with water may interacts with the humic acid in brown coal differently than undiluted aqueous ammonia (e.g. aqueous ammonia with an ammonia content ranging from about 25% to about 30%). Use of a diluted aqueous ammonia may result in an increase in the amount of humic acid extracted, as well a higher humic acid content in the final product and a lower pH. Furthermore, the efficacy of extraction may increase where the water used to dilute the aqueous ammonia is heated.

Analyses were conducted in order to evaluate the effect of various concentrations of diluted aqueous ammonia and reaction temperature. Commercially available aqueous ammonia with a concentration of 28% was diluted to the desired concentration through the addition of water. The humic acid content ("California Method"), pH, and percent yield and approximate freezing temperature of the solutions were determined. The results are presented in Table 2 below.

TABLE 2

| Ex # | Ammonia content after dilution | Lignite: Diluted Aqueous Ammonia Ratio | Water Temp. (degrees C.) | Dissolved Solids Content | Humic Acid Content | Solution Yield | pH | Appx. Freeze Temp. (degrees F.) |
|---|---|---|---|---|---|---|---|---|
| 1 | 14% | 1:5 | Ambient | 10.4% | 8.1% | 74% | 11.3 | −12 |
| 2 | 14% | 1:5 | 50-55 | 11.4% | 8.9% | 75% | 11.3 | −12 |
| 3 | 9.33% | 1:5 | Ambient | 11.24% | 8.94% | 76% | 10.9 | 12 |
| 4 | 9.33% | 1:5 | 50-55 | 12.22% | 9.57% | 76% | 10.8 | 12 |
| 5 | 7% | 1:5 | Ambient | 11.8% | 9.2% | 76% | 10.9 | 14 |
| 6 | 7% | 1:6.5 | Ambient | 7.84% | 6.1% | 72% | 11.1 | 14 |
| 7 | 5.6% | 1:5 | 50-55 | 10.74% | 8.4% | 76% | 10.7 | 16 |
| 8 | 4% | 1:5 | 50-55 | 10.6% | 8.3% | 76% | 10.6 | 17 |
| 9 | 2.8% | 1:5 | 50-55 | 10.5% | 8.2% | 76% | 10.2 | 18 |
| 10 | 1% | 1:5 | 50-55 | 8.7% | 6.8% | 76% | 8.8 | 23 |
| 11 | 0.5% | 1:5 | 50-55 | 5.4% | 4.2% | 76 | 7.4 | 28 |

As is illustrated by Examples 1 and 2, in Table 2, which are identical other than the water temperature, heating the water used to dilute the aqueous ammonia to about 50 degrees Celsius to about 55 degrees Celsius prior to mixing with the aqueous ammonia results in an increase in dissolved solids content and humic acids content. Not illustrated by the data of Table 2, in Examples 2 and 4 the temperature of the water dropped to about 42 degrees Celsius to about 45 degrees Celsius after added to the commercially available aqueous ammonia with a concentration of 28%.

As generally illustrated by the results of Table 2, use of a diluted aqueous ammonia may result in a higher quality supernatant with a higher content of dissolved solids and humic acid, a higher yield, a lower pH, and acceptable freezing temperature. Furthermore, the lower the ammonia content after dilution, the less ammonia smell is present. The results presented above indicate that a water to aqueous ammonia ratio from 1:1 (14% ammonia concentration) to 9:1 (2.8% ammonia concentration) may yield the best results; while a lignite to aqueous ammonia solution of 1:5 may yield the best results. As illustrated in Table 2, these ammonia concentration result in higher dissolved solids/humic acid content, a pH at about 11 and below, and a low freezing temperature—around 18 F and below; however, the ammonia smell may still be significant. Furthermore, the lower the ammonium content the less ammonia volatilization, thus reducing the smell and irritation to eyes, skin, and respiratory system during the product manufacture and application. No to minimal ammonia smell may be present where the water to aqueous ammonia ratio is about 28:1

(total ammonia content is about 1%) or less (for example, total ammonia content 0.5%). However, these ammonia contents, for example with a total ammonia content of 0.5% may result in low dissolved solids content (5.4%) and humic acid content (4.2%). This is why a minimum ammonia content of about 1% may be preferable.

The higher efficacy resulting from the use of diluted aqueous ammonia in the extraction of humic acids may be based on the chemisorption of ammonia ($NH_3$) with water molecules ($H_2O$), which results in aqueous ammonia $[NH_3\text{—}H]^+\text{—}OH^-$, which is also known as ammonium hydroxide $NH_4^+(OH)^-$. Dilution of the aqueous ammonia results in less ammonia by volume, more ammonia ionization to ammonium, and an increased rate of replacement of exchangeable protons and metals cations of humic acid by ammonium. Furthermore, the diluted solution may also have an increased buffering ability, which may facilitate humic acid remaining in the form of dissolved stabilized ammonium humate.

Therefore, in accordance with the examples presented with reference to Table 2, the materials for manufacturing a stabilized ammonium humate may include water heated for about 50-to about 55 degrees Celsius, commercially available aqueous ammonia with ammonia concentration 25% to about 30%, and brown coal. In some instances, the brown coal may be ground to maximum particles size of about 1 mm to about 3 mm prior to the reaction.

In some instances, water is added to a reactor or mixer once heated to the desired temperature (about 50 to about 55 degrees Celsius) the water may be pumped into the reactor or mixer; in other instances, the water may be heated in the reactor or mixer to the desired temperature. The commercially available aqueous ammonia may then be pumped into the reactor or added to the mixer. In some instances, the addition of the aqueous ammonia may be done slowly while mixing with the heated water, so as to avoid release of excessive ammonia to the atmosphere. In some instances, the temperature of the water may be closely monitored. The boiling temperature of aqueous ammonia is 60 degrees Celsius, and adding aqueous ammonia to water that is about 60 degrees Celsius or higher could result in excessive ammonia being released. Conversely, in some instances, where the water temperature is lower than about 50 to about 55 degrees Celsius, for example when the water temperature is about 40 degrees Celsius to about 45 degrees Celsius, the mixing with the commercially available aqueous ammonia may result in the mixture have a temperature around 30 degrees Celsius, which may lead to a decreased yield of humic acid. However, where the water temperature is about 50 to about 55 degrees Celsius, the mixing with the commercially available aqueous ammonia may result in the mixture have a temperature around 42 degrees Celsius to about 45 degrees Celsius and effective humic acid extraction.

In an example, stabilized ammonium humate as described herein may be manufactured in a 4,000 gallon (15,140 liter) mixer with a 3,600 gallon (13,626 liter) working capacity. Approximately 2,006 gallons (7,593 liters) of water may be heated up to temperature between about 50 degrees Celsius and about 55 degrees Celsius and pumped into the reactor. In other instances, the water may be heated to about 50 degrees Celsius and about 55 degrees Celsius within the reactor itself. A propeller type mixer may be used, and approximately 1137 gallons (4304 liters or 3856 kg) of commercially available aqueous ammonia (28% concentration) with an ambient temperature (about 22 degrees Celsius) may be added to the reactor. The mixing is not limited to a propeller type mixer, and may be done with other types of mixers, blenders, etc. known in the art. The mixing of the heated water and aqueous ammonia may result in the mixture having a temperature of about 45 degrees Celsius. Following the mixing of the heated water and the aqueous ammonia, about 5438 lbs. (2466 kg) of lignite was added to the reactor, which may result in lignite interaction with the aqueous ammonia solution without precipitation. In the example presented herein, the water, aqueous ammonia, and lignite may result in a total volume equal to approximately 3,600 gallons, or working capacity of the reactor. In the example presented herein, the ratio of heated water to aqueous ammonia is about 2:1, and the ration of lignite to diluted aqueous ammonia is about 1:5. The diluted aqueous ammonia and lignite may be mixed for about 20 minutes. However, this time period is not to be construed as limiting, as in some instances the mixing time may be shortened or lengthened.

Following the mixing, the reactor may be turned off and the mixture may be transported (e.g. through pumping) to a storage tank where sediment may precipitate. Once the sediment has precipitated for about 12 to about 24 hours, supernatant may be removed (e.g. through pumping) and used. The supernatant may have a yield of about 76%. The pH of the supernatant may be about 10.8, with a solid content of about 11.9%, 9.15% of which being humic acid. The supernatant may be meet various commercial regulations for labeling as nontoxic, inflammable/incombustible, noncorrosive, but may be classified as a mild skin and eye irritant with an ammonia smell. Its freezing temperature may be approximately 12 degrees F. This may allow for use a cost-effective agricultural product without the restrictions of many other ammonia-based products.

As a result of the described process, stabilized ammonium humate is produced and the ammonium volatilization into ammonia is significantly reduced as compared to known processes. The sediment resulting from the process is not used in the generation of saturated ammonium humate and may sold or given away for other uses. The resulting stabilized ammonium humate ("SAH") was tested as a coating agent on urea, mono-diammonium phosphate, ammonium sulfate, potash (potassium chloride) granules; the stabilized ammonium humate was also tested as a component of mix of these granulated fertilizers.

When the urea 46-0-0 granules were coated with the SAH to a dose of 0.5 gallons/ton the resulting coating granules are dry due to the rapid absorption and partial evaporation of the water. When the urea 46-0-0 granules were coated with the SAH to a dose of 1.0 gallons/ton the resulting coating granules are slightly wet, and the conversion to a dry state takes approximately 10-15 minutes. When the urea 46-0-0 granules were coated with the SAH to a dose of 1.5 gallons/ton the resulting coating granules are wet, resulting in some aggregation of the granules; furthermore, drying takes more than 30 minutes. This indicates that a dose of 0.5-1.0 gallon/ton may be desirable. The testing described below utilizes urea granules coated at a dose of 0.5 gallons/ton of SAH; the coated urea was initially slightly wet but dried within a few minutes.

There may be several mechanisms of nitrogen loss in soil. Some non-limiting examples of nitrogen loss include: urea may rapidly dissolve and seep through the soil profile; urea may decompose resulting in ammonia volatilization to the atmosphere; nitrification may result in nitrates leaching from the soil; and, denitrification may result in the release of nitrous oxides and molecular nitrogen into the atmosphere.

The SAH coating on urea granules may alter the mechanisms of nitrogen loss described above. The interaction between urea $(NH_2)_2CO$ and the SAH molecules disposed on the surface of the urea granules may be described as the following:

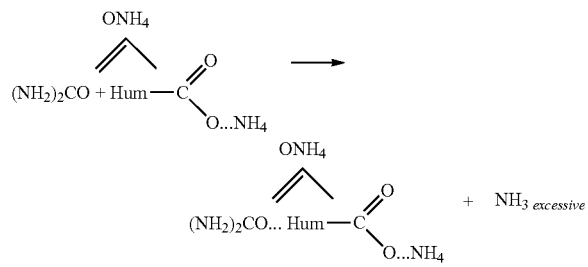

This interaction may result in complex "urea-humic" molecules called adducts with hydrogen type bonds between them. In adduct molecules both constituents keep the features each had before the interaction. Some release of ammonia ($HN_3$ $_{excessive}$) may be detectable here.

SAH coated urea dissolves in soil (due to soil moisture) slower that uncoated urea resulting in "slow release" fertilizer. The natural process of urea decomposition to ammonium hydroxide $NH_4OH$ (followed by ammonia volatilization) and carbonic acid $H_2CO_3$ (followed by carbon dioxide release) is primarily caused by enzyme (urease) activity in soil and can be described as the following schematic formula:

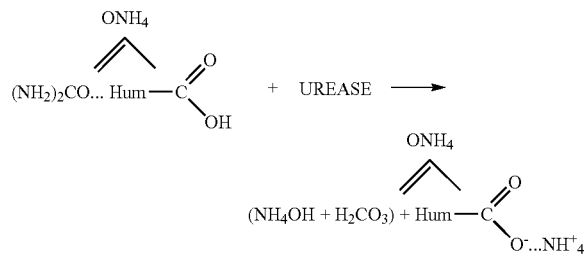

The formation of ammonium hydroxide results from the interaction of urea with the naturally dried SAH coating results in SAH solubilization and diffusion into soil. SAH molecules, as well as the ammonium hydroxide associated with them, may be more attracted to (or adhesive to) organic and/or mineral matter in the soil than original ammonia/ammonium. Therefore, the soil may absorb more ammonium in the SAH form than ammonia/ammonium.

Once absorbed by soil particles, ammonium nitrification may result in acidic anions of nitrite and nitrate, which are nitrous ($HNO_2$) and nitric ($HNO_3$) acids. This results in soil acidification.

The interaction of, for example, nitric acid and SAH may be illustrated by the following schematic formula:

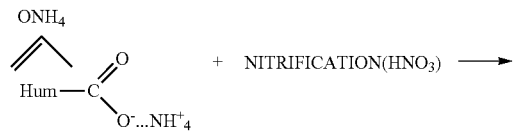

-continued

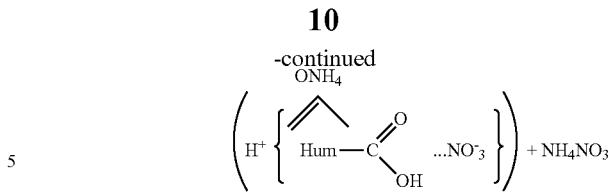

The Ammonium in the carboxyl group may be completely replaced by acidic hydrogen cations (via ion exchange mechanism). While, the ammonium in the phenolic group may be less available for replacement by protons due to stronger bonds between ammonium and oxygen in phenolic groups; only strong acidity may result in ammonium replacement in these groups. Therefore, ammonium replacement by protons in carboxylic group may result in humic coagulation into insoluble fine/colloidal water saturated associates (e.g. flakes)—the fundamental humic acid property: to dissolve in interaction with alkali and to coagulate in interaction with acid. Nitrate-ions may be occluded into coagulated volumetric structures; in other words, nitrates may be immobilized, eliminating or limiting their ability to migrate through the soil profile. As a result, the nitrate may not be leached away because the coagulated humic molecules may be tightly bound with soil particles due to "hydrophilic-hydrophilic" and "hydrophobic-hydrophobic" interactions. Protons ($H^+$) remain mobile because of their low mass and size, but they do continue to be in and around coagulated humic associates (flakes) due to their cation exchange capacity CEC (positively charged protons are attracted by negatively charged nitrate and humic/hulvic acids negatively charged sites) thus keeping coagulated humic electrically neutral). Exchangeable ammonium may interact with non-occluded nitrates resulting in ammonium nitrate ($NH_4NO_3$), but this is not the dominating process and only minor ammonium nitrate formation is possible.

Nitrates may be occluded in coagulated humic structures, resulting in most nitrates being unavailable for leaching and migration from top soil in deep layers as the occluded nitrates stay on the top soil and available for adsorption by plant root system.

The SAH produced according to the embodiments described herein was also tested in field tests. The SAH was added to urea granules at a dosing ratio of one-gallon SAH to one ton of urea granules and mixed for about 2 to about 3 minutes, resulting in urea granules with a homogeneous coating of SAH. The slightly wet coated urea granules dry in around 10 minutes without aggregation of the urea granules, tackiness, etc. Coated urea granules may be able to easily flow in all processes of loading, unloading, spreading, etc.

Field spots were prepared for three types of tests sites: (1) control; (2) SAH coated urea; and (3) urea coated with other commercial preparations (nitrogen stabilizers) in recommended doses. Each were applied at appropriate doses and corn seeds were planted in accordance with local agrochemical practice.

The nitrogen content in the soil in form of nitrates (in ppm and lbs./acres) was measured before and after test (3 months) in all field spots. Available phosphorus and potassium were also measured before and after test. The results are presented in Table 3 below.

TABLE 3

| Treatment | Nitrate (ppm) | Nitrate (lbs./acre) | Phosphorus (ppm) | Potassium (ppm) |
|---|---|---|---|---|
| Control | 5.7 | 14 | 116 | 518 |
| SAH | 23.9 | 57 | 170 | 710 |
| Nutrisphere-N ® | 9.5 | 23 | 116 | 534 |
| Azoteren Aeris | 7.9 | 19 | 94 | 567 |
| Azoteren Stratum | 8.1 | 20 | 152 | 637 |
| Instinct ® HL | 16.4 | 39 | 168 | 493 |
| Agrotain ® Advanced 1.0 | 12.9 | 31 | 132 | 573 |

SAH demonstrates increased nitrogen stabilization as well as available phosphorus and potassium content in soil in comparison with control and commercially available fertilizer coatings. For example, the SAH treatment demonstrates a nitrate measurement of 23.9 ppm 3 months following treatment versus 5.7 ppm in the control and 9.5 ppm in the case of treatment with Nutrisphere-N®. Furthermore, there are 57 lbs./acre of nitrate where the SAH treatment was applied, 14 lbs./acre at the control site, and 23 lbs./acre where Nutrisphere-N® was applied; in other words, treatment with SAH allowed 3.07 times greater nitrogen content in soil as compared with the control and 1.48 times greater nitrogen content in comparison with Nutrisphere-N®.

At the same time, treatment with SAH also results in higher available phosphorus—170 ppm with SAH treatment versus 116 ppm in the control and 116 ppm with Nutrisphere-N®. This is approximately a 46.6% increase in the available phosphorus content in comparison with the control and the Nutrisphere-N® treatment. Furthermore, treatment with SAH results in an increase in available potassium; for example treatment with SAH yields 710 ppm of available potassium versus 518 ppm in the control and 534 ppm when treated with Nutrisphere-N®. This is approximately a 37% increase in available potassium in comparison with the control and approximately a 32.9% increase in comparison with Nutrisphere-N®. As demonstrated herein, SAH improves soil composition, properties and functions. Because of this, the application of SAH also reduces the amount of fertilizer necessary by approximately 20 to 50%.

Although described herein with respect to coating urea granules, the use of the described stabilized ammonium humate (SAH) is not so limited. It is to be understood that SAH may be used to coat other types of fertilizer granules in order to manage nitrogen, phosphorus, and/or potassium release into the soil.

What is claimed is:

1. A stabilized ammonium humate mixture/solution, comprising:
   an amount of humic acid ranging between about 7% to about 10% of the mixture; and
   an amount of aqueous ammonia ranging between about 1% to about 14% of the mixture;
   wherein a remainder of the mixture is water;
   wherein the water and aqueous ammonia form an ionized ammonium hydroxide, and the ionized ammonium hydroxide and the amount of humic acid thereby form stabilized ammonium humate mixture; and
   wherein the stabilized ammonium humate mixture has a pH between about 9 to about 11.

2. The stabilized ammonium humate mixture of claim 1, wherein the amount of ammonia ranges between about 7% and about 9.5%.

3. The stabilized ammonium humate mixture of claim 1, wherein the amount of ammonia ranges between about 9% and about 10%.

4. The stabilized ammonium humate mixture of claim 1, wherein the amount of humic acid ranges between about 7% and about 9%.

5. The stabilized ammonium humate mixture of claim 1, wherein the mixture is configured to coat a mineral fertilizer granule.

6. The stabilized ammonium humate mixture of claim 5, wherein the mineral fertilizer granule is a urea granule.

7. A method of manufacturing stabilized ammonium humate, comprising:
   obtaining a humic acid containing material with a particle size of about 3 millimeters or less;
   heating water to about 50° C. to about 55° C.;
   mixing the heated water and an about 25% to about 30% aqueous ammonia solution at a ratio ranging between about 1:1 to about 28:1 to form an ionized ammonium hydroxide;
   adding the humic acid containing material to the ionized ammonium hydroxide at a ratio of 1:5;
   mixing the humic acid containing material and the ionized ammonium hydroxide forming a slurry;
   separating the slurry into a supernatant and a precipitate, wherein the supernatant is the stabilized ammonium humate and sediment.

8. The method of claim 7, wherein the particle size is about 1 millimeter to about 3 millimeters.

9. The method of claim 7, wherein the ratio of heated water to the about 25% to aqueous ammonia is 2:1.

10. The method of claim 7, wherein the mixing of the humic acid containing material and the ionized ammonium hydroxide is for about 20 minutes.

11. The method of claim 7, wherein the supernatant has a yield of about 76% to about 80%.

12. The method of claim 7, wherein the supernatant has a dissolved solid content of about 9% to about 12%.

13. The method of claim 7, wherein the supernatant includes about 7.0% to about 10.0% humic acid.

14. The method of claim 7, wherein separating the slurry into the supernatant and the precipitate is by gravity.

15. A method of nutrient management of soil, comprising:
   obtaining stabilized ammonium humate mixture, wherein the mixture includes:
      humic acid ranging between about 7.0% to about 10% of the mixture, and
      an amount of ammonia ranging between about 1% to about 14% of the mixture,
      wherein a remainder of the mixture is water, and
      wherein the stabilized ammonium humate mixture has a pH between about 9 to about 11;
   mixing the stabilized ammonium humate with a fertilizer granule at a dosage of about 0.5 to about 1.0 gallons of the stabilized ammonium humate per ton of fertilizer.

16. The method of claim 15, wherein the fertilizer granule is a urea granule.

* * * * *